J. H. HOWARD.
OVERHEAD TROLLEY.
APPLICATION FILED SEPT. 11, 1907.

910,197.

Patented Jan. 19, 1909.

3 SHEETS—SHEET 1.

Witnesses:
R. E. Hamilton
H. C. Rodgers

Inventor,
J. H. Howard.
By George H. Thorpe, Atty.

J. H. HOWARD.
OVERHEAD TROLLEY.
APPLICATION FILED SEPT. 11, 1907.

910,197.

Patented Jan. 19, 1909.
3 SHEETS—SHEET 2.

Witnesses:
R. E. Hamilton
H. C. Rodgers

Inventor
J. H. Howard.
By George H. Thorpe, Atty.

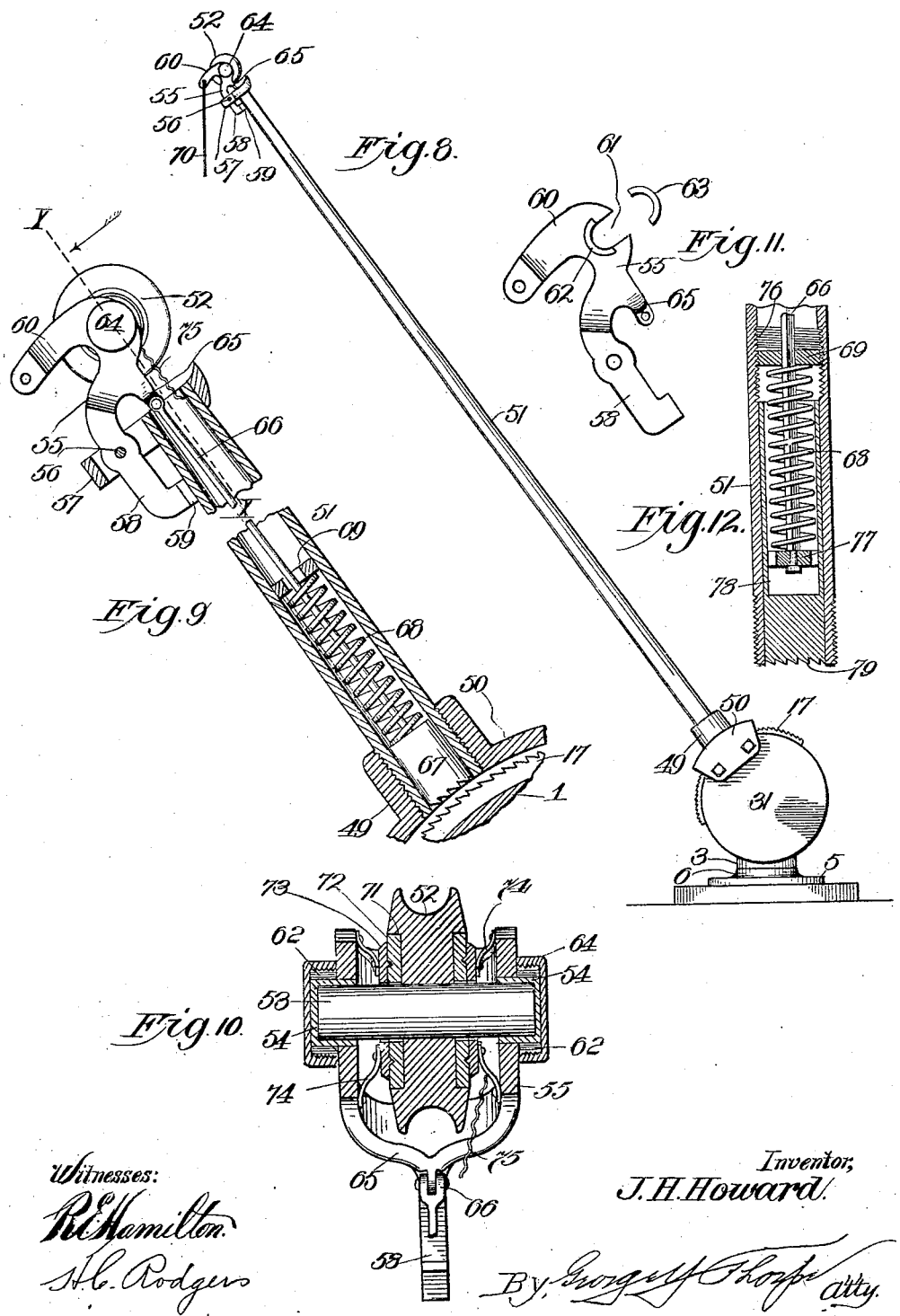

UNITED STATES PATENT OFFICE.

JAMES H. HOWARD, OF KANSAS CITY, KANSAS.

OVERHEAD TROLLEY.

No. 910,197.     Specification of Letters Patent.     Patented Jan. 19, 1909.

Application filed September 11, 1907. Serial No. 392,390.

*To all whom it may concern:*

Be it known that I, JAMES H. HOWARD, a citizen of the United States, residing at Kansas City, in the county of Wyandotte and State of Kansas, have invented certain new and useful Improvements in Overhead Trolleys, of which the following is a specification.

My invention relates to overhead trolleys for electric cars, and my object is to produce a device of this character in which the trolley wheel shall impose the same pressure on the trolley wire irrespective of the distance of the latter above the car.

A further object is to produce means whereby the upward pressure imposed by the trolley wheel may be increased or diminished.

A further object is to produce means for locking the trolley pole against materially upward movement in the event that the trolley wheel leaves the trolley wire and to provide means whereby a downward pull on the trolley shall unlock the pole and permit the latter to be swung downward.

With these and other objects in view, the invention consists in certain novel and peculiar features of construction and organization as hereinafter described and claimed; and in order that it may be fully understood reference is to be had to the accompanying drawings, in which—

Figure 1:
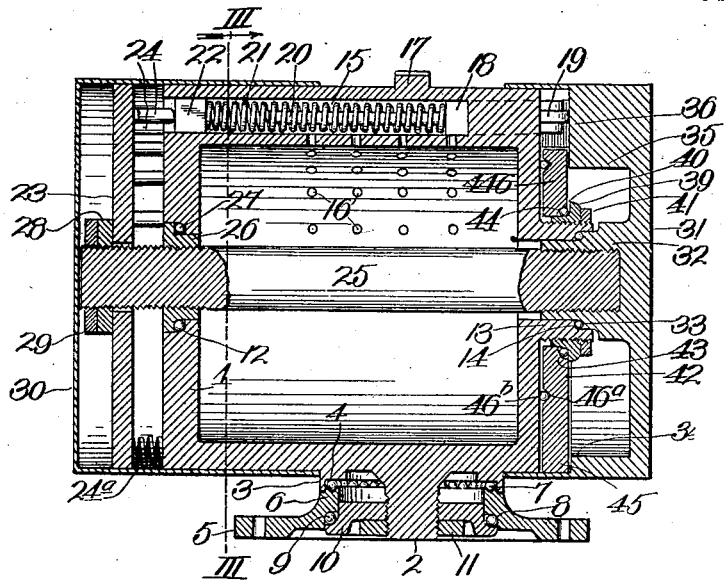
Figure 2:
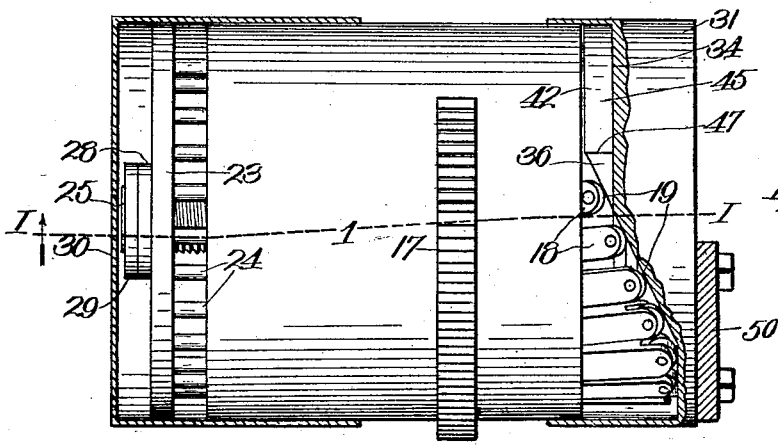
Figure 7:
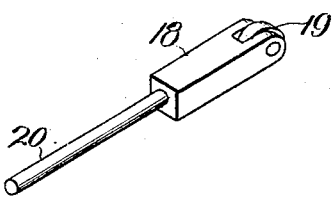
Figure 3:
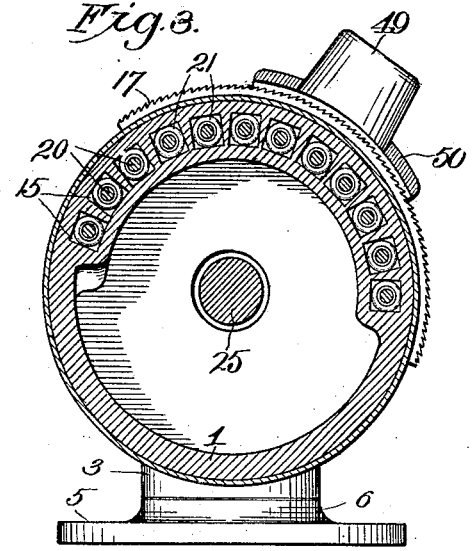
Figure 4:
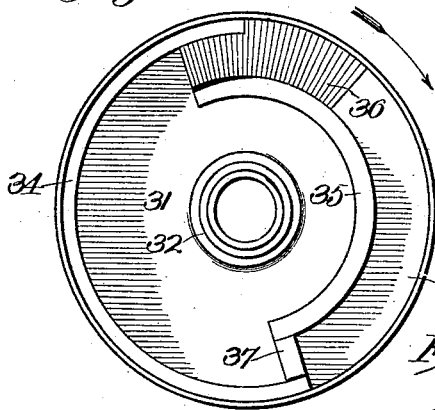
Figure 5:
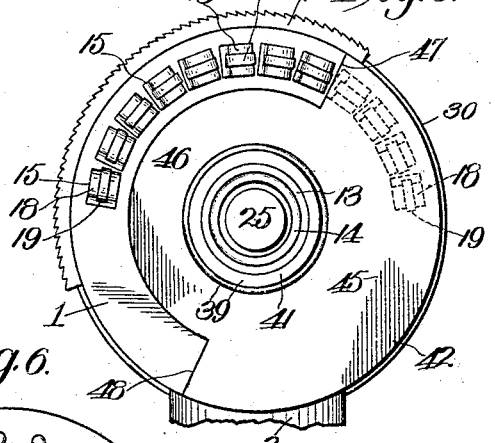
Figure 6:
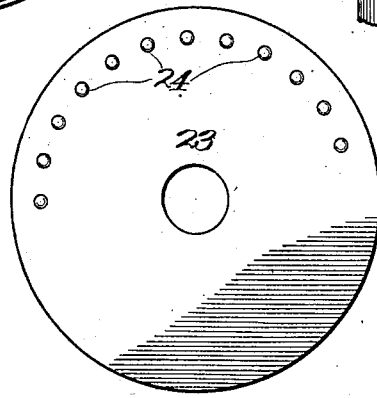

Figure 1, is a vertical section of a trolley-pole mount taken on the line I—I of Fig. 2. Fig. 2, is a top plan view of the same with one of the caps in horizontal section and the other partially in horizontal section and partly broken away. Fig. 3, is a vertical section on the line III—III of Fig. 1. Fig. 4, is an inner face view of the trolley pole carrying cap. Fig. 5, is an end view with the trolley pole carrying cap omitted. Fig. 6, is an inner face view of means for effecting the increase or relaxing of the upward pressure on the trolley pole. Fig. 7, is a detail perspective view of one of the spring-actuated plungers for pressing the trolley pole upward. Fig. 8, is a view on a smaller scale than Figs. 1 to 6 showing the mount and trolley pole equipment therefor. Fig. 9, is an enlarged longitudinal section of the pole—broken away—and also of a part of the mount. Fig. 10, is a section on a still greater scale, taken on the line X—X of Fig. 9 with the trolley pole omitted. Fig. 11, is a detail side view of the trolley wheel yoke and one of the caps to coöperate therewith in forming a journal for the pin or shaft of the trolley wheel. Fig. 12, is a sectional view of the trolley pole, broken away to show the means for varying the pressure on the spring for locking the pole with the stationary part of the mount.

Referring now to the drawings in which like reference characters identify corresponding parts in all the figures, 1 indicates a cylinder whose wall for about half its circumference is of increased thickness.

2 is a threaded stem depending from the cylinder in the vertical plane of its center but preferably nearer one end of the cylinder than the other, and 3 is a circular flange formed integral with the cylinder and depending therefrom concentrically with respect to the stem 2 and provided with a groove 4.

5 indicates a base-ring adapted to be secured on top of the trolley car (not shown) in any suitable manner and provided with a flange 6 projecting upwardly into flange 3, a series of balls 7 being interposed between said flanges so as to constitute a ball bearing between the cylinder and the stationary base. The base 5 is provided with a downwardly-disposed circular shoulder 8 to receive balls 9 also resting on the flanged lower edge of a bearing plate 10 fitting in the base and screwed upon the stem 2 by preference, nut 11 also engaging said stem to prevent unscrewing movement of said bearing plate. The cylinder is provided in its ends with axial openings, one being formed in the downwardly disposed shoulder 12 and the other in the outwardly projecting threaded boss 13 having an outwardly disposed shoulder 14. The thickened portion of the wall of the cylinder is provided with a series of parallel longitudinally extending passages 15 arranged concentrically around the axis of the cylinder, these passages preferably extending at an angle to the ends of the cylinder for a purpose which hereinafter appears, and 16 are holes establishing communication between passages 15 and the interior of the cylinder to permit lubricating grease to work from the interior of the cylinder through said holes and thus lubricate certain parts arranged in said passages.

17 is a ratchet toothed rib projecting from and extending transversely of the cylinder in the vertical plane of stem 2, and 18 indicates plungers fitting in passages 15 so as to be capable of sliding but not turning therein, the front ends of said plungers being bifurcated and equipped with antifriction rollers 19 whose axes extend radially with respect to the axis of the cylinder. The plungers are reduced at their opposite ends to provide stems 20 and fitting on said stems and bearing at one end against the body portions of the plungers are helical springs 21, said springs projecting preferably beyond the rear ends of stems 20, for engagement by suitable adjusting means whereby more or less compression force may be imposed on the springs, the adjusting means shown comprising a series of slide plates 22 fitting in passages 15 and a disk 23 equipped with pins 24 engaging said slide plates at the opposite side from the springs, an equalizing spring 24$^a$ being interposed between the cylinder and plate 23 at the opposite side of shaft 25 from springs 21, for the purpose of maintaining the plate 23 parallel with the opposing end of the cylinder. The disk or plate 23 fits slidingly on shaft 25 extending through the cylinder and equipped with a flanged collar 26 occupying the opening in one end of the cylinder and having its flange bearing against a series of balls 27 resting on shoulder 12, a pair of nuts 28 and 29 are secured upon the shaft to force the pin carrying disk toward the spring, nut 29 forming a lock nut for nut 28.

30 indicates a cap inclosing the end of the cylinder equipped with the spring tensioning means and 31 is a cap inclosing the opposite end of the cylinder and provided centrally with an inwardly projecting tubular boss 32 engaging the contiguous end of shaft 25 and provided with a rearwardly disposed shoulder 33. Cap 31 is also provided at opposite sides of its center with a pair of oppositely disposed substantially semi-circular flanges 34 and 35 extending concentrically of the center of the cap, said flanges 34 and 35 being of such diameter as to provide a space between them sufficiently wide to receive the plungers 18 and connecting the overlapping ends and occupying portions of said space at opposite sides of the center of the cap is a cam 36 and a lug 37, that portion of the cam directly between the said flanges projecting beyond the same, it being also understood that lug 37 projects beyond said flanges a corresponding distance, that is to say a distance which almost brings it into frictional engagement with the opposing end of the cylinder, it being noted that the space between the exterior side of flange 35 and the wall of the cap forms a pocket 38 of which cam 36 forms one end and lug 37 the other.

39 indicates a screw ring engaging the threaded boss 13 of the cylinder and provided with a groove 40 and locked at the desired point on said boss by lock nut 41 also engaging the boss.

42 is a plate journaled on the inner end of screw-ring 39 and fitting snugly between the same and the end of the cylinder and provided with a circular groove 43 to receive balls 44 which also engage the groove of the screw ring. The plate 42 comprises a semicircular portion 45 to fit snugly in the cap 31 and overlap flange 34 thereof, and a smaller portion 46 to overlap flange 35 of the cap and interposed between the end of the cylinder and said plate 42 and occupying the groove 46$^a$ therein are balls 46$^b$. Plate 42 is so arranged that its radial shoulder 47 bears against the abrupt edge or face of cam 36 and its radial shoulder 48 engages the lug 37 at the opposite side of the same from the space or pocket 38, so that when the cap moves in one direction the abrupt face of the cam will rotate the plate in the same direction and when its movement is reversed the lug 37 will impart like movement to said plate.

49 is a trolley pole holder arranged radially with respect to the cylinder and in the vertical plane of the toothed rib thereof and said holder is movable with the cap 31. As shown said holder is cast with the angle plate 50 secured to the cap.

51 indicates the usual hollow trolley pole with its lower end screwed into the holder 49 so as to move with the cap.

52 indicates the trolley wheel at the upper end of the pole. The trolley wheel may be of any suitable or preferred construction and connected in any suitable or preferred manner to the pole. As shown the trolley wheel is mounted rigidly on an aluminum pin or shaft 53 equipped with hard steel bearing caps 54. A yoke 55 is pivoted at 56 in the bracket 57 carried at the top of the pole, and comprises a stem 58 normally bearing against a lug 59 of the pole and a pair of branch arms 60 which arms are of substantially inverted-U shape in side view and are provided in the upper side of their arched portions with U-shaped recesses 61 to receive the caps 54, semicircular bearing flanges 62 projecting outward from said arms to provide a wide bearing for the caps, the opposite sides of the caps fitting in the half sleeves 63 which fit down upon the flanges 62. To hold the half sleeves 63 and hence the trolley wheel in place caps 64 are screwed onto the flanges 62 and half sleeves 63, said flanges 62 and half sleeves being externally threaded for this purpose. The yoke arms are connected by a cross arm 65 to which is secured pivotally as shown in Fig. 10, the upper end of a rod 66 extending through the trolley pole and provided at its lower end with a toothed enlargement 67 for engagement at times with the ratchet toothed rib 17. A spring 68 is arranged within the pole and around the rod 66 and bears at its opposite ends against enlargement 67 and against a stationary perforated partition 69 through which rod 66 extends. By this arrangement it will be seen that when the trolley pole presses the trolley wheel upwardly and forwardly against the trolley wire the resistance of spring 68 is overcome and the toothed enlargement of rod 66 is withdrawn from engagement with toothed rib 17. It will also be seen that when the person in charge of the car grasps the trolley rope 70 which is attached to the pivoted yoke as shown in Fig. 8, and pulls downward on said rope, the toothed enlargement of the rod will be withdrawn from the toothed rib so as to permit the trolley pole to be drawn downward without permitting the said toothed enlargement to slide frictionally upon the toothed rib, it being noted in this connection that the engagement of the yoke with projection 59 limits the outward movement of said enlargement just enough to properly clear the toothed rib and incidentally prevents any unnecessary strain being imposed upon the spring 68 when the trolley wheel is pressing against the wire or when the operator is pulling the pole down.

The trolley wheel shown is provided with circular recesses 71 in its sides and fitting therein are carbon or equivalent contact plates 72 held in place by metallic plates 73 carried by and pressed against said carbon plates by spring arms 74, secured to the yoke, and connecting one of said spring plates with the trolley pole is a flexible-lead conductor 75, this lead-conductor providing the path of least resistance for the current from the trolley wheel to the trolley pole so that practically no current shall pass through the bearings of the pin or shaft or through the pivotal point 55.

Fig. 12 discloses a construction whereby the tension of spring 68 may be quickly varied. In said figure the pole is provided with internal threads 76 and the partition 69 is threaded and engages threads 76 and the perforation of the partition is rectangular to receive the rod 66 which rod is also of rectangular form for that portion of its length opposite the threads 76. At its inner or lower end the rod is swiveled to the cross piece 77 of the sleeve 78 fitting slidingly in the trolley pole, the inner end of said sleeve being provided with teeth 79 for engagement with the toothed rib 17, this toothed sleeve corresponding in function and effect to the enlargement 67 of rod 66 that is to say it slides outward when the trolley wheel is swung downward either through the pressure of the trolley wire or by a pull on the rope, it being noted that in this action the squared portion of the rod slides in partition 69. When it is desired to vary the tension of the spring 68 it can be accomplished by disconnecting rod 66 from the trolley yoke or harp and turning the former by means of a wrench or otherwise, this turning movement causing the partition 59 to screw downward and compress the spring. The tension of the latter can be relaxed by turning the rod in the opposite direction.

In practice it will be seen by reference to the drawing particularly Fig. 2, that the pressure of the spring-actuated plunger is adapted to swing the pole forward toward the vertical and hold it in such position and it will be understood that when the rod is grasped and the pole pulled down, the cap rotates in the direction indicated by the arrow Fig. 4, so that its cam 36 shall come into engagement with the rollers of the plungers successively and repress the latter against the resistance of their springs 21, it being further noted that the cam is of such length as to simultaneously engage four of the rollers at a time so that the pressure of a corresponding number of springs 21 shall be applied on the cam for the purpose of pressing the trolley wheel upward against the trolley wire. It will be understood of course that I do not restrict myself to the pressure of any particular number of the plungers on the cam as by varying the length of the latter or by a variation in the spacing between the plungers this might be changed, but it is to be understood that there shall always be the same number of plungers in engagement with the cam when the trolley pole is pulled back of the vertical and is in engagement with the trolley wire so as to insure the imposition of a uniform pressure on the trolley wire at all times without regard—within certain limits—to its distance above the car.

Assuming that the cam is in the position shown in Fig. 2 and the pole is consequently disposed as shown in Fig. 8, it will be seen that four of the plungers are pressing against the cam and that the plungers which the cam has not yet engaged are projecting into the space or pocket 38 of cap 31 without imposing any pressure on said cap because their springs 21 will be fully extended, and that the plungers at the opposite end of the cam which the latter has passed, will be applying their pressure against the inner face of portion 45 of plate 42 as shown in Figs. 2 and 5. The plungers pressing against said plate will be inoperative as regards affecting movement of the pole and will have become inoperative because the turning of the trolley pole by the pull on the rope has through the pressure of lug 37 on shoulder 48 rotated plate 42 and caused said plate to successively engage the fully repressed plungers at the instant the cam cleared them, as will be readily understood by reference to Fig. 2 in which it will be seen that the widest and deepest portion of cam lies in the same vertical plane as the plate 42.

When the car passes through a tunnel or under a bridge or at any other point where the trolley wire is depressed beyond its normal position, the pole will be forced downward and the cam will successively repress one or more additional plungers, a corresponding number of the latter at the same time becoming inoperative through the action of plate 42, as explained. When the car passes out of the tunnel or from under the bridge or if from any other cause the trolley wire rises the trolley wheel will follow because the pole will be swung forward under the pressure of the spring-actuated plungers of the cam, it being noted in this connection that the trolley wheel is imposing the same pressure on the wire at all times because only a predetermined number of the spring-actuated plungers is exerting pressure simultaneously on the cam. The swinging movement of the trolley in both directions takes place without interference on the part of the trolley locking mechanism because the wheel is at all times imposing a pressure on the trolley wire greater than that exerted by spring 68.

Should the wheel jump the wire, the spring 69 will instantly force the toothed head of rod 66 into engagement with the toothed rib and thus prevent any material upward movement of the trolley pole so that the conductor can easily and quickly draw it downward preliminary to replacing the wheel upon the wire.

The ball bearings provided assure operation of the trolley pole with the minimum of friction and the grease stored in the cylinder keeps such bearings and the cam and rollers 19 properly lubricated so as to reduce friction to the minimum and the ball-bearing swivel connection between the cylinder and the base 5 permits the pole to be swung around from one end of the car to the other in the usual manner with the minimum of friction.

Having thus described the invention what I claim as new and desire to secure by Letters Patent, is:—

1. A trolley pole mount, comprising a pair of members one having a cam curving concentrically of its axis and rotatable with relation to the other member, a plurality of spring-actuated plungers carried by the other member and adapted for successive engagement with said cam, and a trolley pole carried by the rotatable member and pressed yieldingly upward by the plunger or plungers in engagement with the cam.

2. A trolley pole mount, comprising a pair of members one having a cam curving concentrically of its axis and rotatable with relation to the other member, a plurality of spring-actuated plungers engaging the cam of one member and carried by the other and adapted for successive engagement with said cam, a trolley pole carried by the rotatable member and pressed yieldingly upward by the plunger or plungers in engagement with the cam, a trolley wheel carried by and bearing a pivoted relation to the pole, and means to interlock the pole with the stationary member as regards upward movement when the trolley wheel is not pivotally depressed with respect to the pole.

3. A trolley pole mount, comprising a pair of members, one having a cam curving concentrically of its axis and rotatable with relation to the other member, a plurality of spring-actuated plungers engaging the cam of one member and carried by the other and adapted for successive engagement with said cam, a trolley pole carried by the rotatable member and pressed yieldingly upward by the plunger or plungers in engagement with the cam, a toothed rib projecting from the member not carrying the trolley pole and extending concentrically of the axis of said pole, a trolley wheel carried by and bearing a pivotal relation to the pole, a rod bearing a pivotal relation to the wheel at one end and provided with a toothed enlargement at the other and a spring to press said enlargement into engagement with the toothed rib of the stationary member, when unopposed.

4. A trolley pole mount, comprising a base, a member swiveled on said base for movement in a horizontal plane, a second member carried by and rotatable with respect to said swiveled member, a cam on one of said members and spring actuated plungers carried by the other and engaging said cam, and a trolley pole carried by the rotatable member.

5. A trolley pole mount, comprising a pair of members one having a cam curving concentrically of its axis and rotatable with relation to the other member, a plurality of spring-actuated plungers engaging the cam of one member and carried by the other and adapted for successive engagement with said cam, a trolley pole carried by the rotatable member and pressed yieldingly upward by the plunger or plungers in engagement with the cam, and means to vary the pressure of each spring-actuated plunger of the cam.

6. A trolley pole mount, comprising a pair of members one having a cam curving concentrically of its axis and rotatable with relation to the other member, a plurality of spring-actuated plungers engaging the cam of one member and carried by the other and adapted for successive engagement with said cam, a trolley pole carried by the rotatable member and pressed yieldingly upward by the plunger or plungers in engagement with the cam, and means to uniformly and simultaneously vary the pressure of said spring actuated plungers on the cam.

7. A trolley pole mount, comprising a pair of members one having a cam curving concentrically of its axis and rotatable with relation to the other member, a plurality of spring-actuated plungers engaging the cam of one member and carried by the other and adapted for successive engagement with said cam, a trolley pole carried by the rotatable member and pressed yieldingly upward by the plunger or plungers in engagement with the cam, and means for receiving the pressure of the spring-actuated plunger as the cam after effecting their depression successively passes the same.

8. A trolley pole mount, comprising a pair of members one having a cam curving concentrically of its axis and rotatable with relation to the other member, a plurality of spring-actuated plungers engaging the cam of one member and carried by the other and adapted for successive engagement with the cam, a trolley pole carried by the rotatable member and pressed yieldingly upward by the plunger or plungers in engagement with the cam, and a rotatable plate carried by and journaled on the member equipped with the plungers and adapted to rotate with the rotatable member and receive the pressure of the plungers repressed by the cam as the latter successively passes said plungers.

9. A trolley pole mount comprising a cylinder member, a trolley pole arranged radially thereof and bearing a pivotal relation at its lower end with the same, a part movable with the trolley pole and provided with a cam opposite one end of the cylinder, and a plurality of spring-actuated plungers carried by the cylinder and bearing against said cam.

10. A trolley pole mount, comprising a cylinder member, a trolley pole arranged radially thereof and bearing a pivotal relation at its lower end with the same, a part movable with the trolley pole and provided with a cam opposite one end of the cylinder, a plurality of spring-actuated plungers carried by the cylinder and bearing against said cam, and a plate journaled on the member equipped with the plungers and interlocked with the cam-equipped member and provided with a portion adapted to receive the pressure of the plungers successively as the cam after repressing the same passes successively from engagement with them.

11. A trolley pole mount, comprising a cylinder member, a trolley pole arranged radially thereof and bearing a pivotal relation at its lower end with the same, a part movable with the trolley pole and provided with a cam opposite one end of the cylinder, a plurality of spring-actuated plungers carried by the cylinder and bearing against said cam, a plate journaled on the member equipped with the plunger and interlocked with the cam-equipped member and provided with a portion adapted to receive the pressure of the plungers successively as the cam after repressing the same passes successively from engagement with them, a shaft rigid with the cam-equipped member and extending through the cylinder, a plate slidingly mounted on the shaft at the opposite end of the cylinder from the cam-equipped member, and means for adjusting said plate toward the cylinder and causing it to simultaneously increase the tension of the spring-actuated plungers.

12. In a trolley pole mount, a base, a hollow cylinder swiveled thereto for movement in a horizontal plane, and provided with a series of longitudinal passages in communication with its interior, a cap fitting on one end of the cylinder and having a ball-bearing relation with the latter and provided with a cam extending concentrically of its axis, a shaft secured to the cap and extending through the cylinder and having a ball bearing relation with the opposite end of the latter from the cap, a plurality of spring actuated plungers occupying the passages of the cylinder and provided with rollers in the path of said cam, means for varying the tension of said spring-actuated plungers, a plate journaled on the cylinder between the same and the cam-equipped cap, and interlocked with the latter to turn therewith and provided with a portion to overlap the front ends of said passages of the cylinder and hold the plungers of said passages repressed immediately after they are successively repressed by the cam, and a trolley pole carried by the cap.

13. In a trolley pole mount, a base, a hollow cylinder swiveled thereto for movement in a horizontal plane, and provided with a series of longitudinal passages in communication with its interior, a cap fitting on one end of the cylinder and having a ball-bearing relation with the latter and provided with a cam extending concentrically of its axis, a shaft secured to the cap and extending through the cylinder and having a ball-bearing relation with the opposite end of the latter from the cap, a plurality of spring-actuated plungers occupying the passages of the cylinder and provided with rollers in the path of said cam, means for varying the tension of said spring-actuated plungers a plate journaled on the cylinder between the same and the cam-equipped cap and interlocked with the latter to turn therewith and provided with a portion to overlap the front ends of said passages of the cylinder and hold the plungers of said passages repressed immediately after they are successively repressed by the cam, a trolley pole carried by the cap, a trolley wheel carried by and bearing a pivotal relation to the pole, and means to interlock the pole and the stationary members as regards upward movement when the trolley wheel is not pivotally depressed with respect to the pole.

In testimony whereof I affix my signature, in the presence of two witnesses.

JAMES H. HOWARD.

Witnesses:
W. B. JOHNSON,
R. E. MELLING.